United States Patent
Deschamps et al.

(10) Patent No.: US 6,679,039 B2
(45) Date of Patent: Jan. 20, 2004

(54) ROTARY MOWER BLADE

(75) Inventors: Joseph P. Deschamps, Franklin, TN (US); Doyle S. Maxwell, Greenbrier, TN (US)

(73) Assignee: Murray Inc., Brentwood, TN (US)

( * ) Notice: Subject to any disclaimer, the term of this patent is extended or adjusted under 35 U.S.C. 154(b) by 3 days.

(21) Appl. No.: 10/217,260

(22) Filed: Aug. 12, 2002

(65) Prior Publication Data

US 2003/0041581 A1 Mar. 6, 2003

Related U.S. Application Data

(60) Provisional application No. 60/317,184, filed on Sep. 6, 2001.

(51) Int. Cl.[7] ............................................. A01D 34/73
(52) U.S. Cl. ................................................ 56/295
(58) Field of Search ........................ 56/295; D15/17

(56) References Cited

U.S. PATENT DOCUMENTS

| | | | | |
|---|---|---|---|---|
| 2,720,070 A | * | 10/1955 | Arrington | 56/13.4 |
| 2,908,128 A | * | 10/1959 | Mauro | 56/295 |
| 3,910,017 A | * | 10/1975 | Thorud et al. | 56/295 |
| 4,149,358 A | * | 4/1979 | Comer | 56/13.4 |
| 4,205,512 A | * | 6/1980 | Thorud | 56/13.4 |
| 4,214,426 A | * | 7/1980 | Lindblad | 56/295 |
| 4,375,148 A | * | 3/1983 | Beck | 56/295 |
| 4,628,672 A | * | 12/1986 | Jones | 56/295 |
| 5,094,065 A | * | 3/1992 | Azbell | 56/255 |
| 5,284,006 A | | 2/1994 | Sheldon | 56/255 |
| 5,711,141 A | | 1/1998 | Pitman et al. | 56/255 |
| 6,052,979 A | * | 4/2000 | Tutschka | 56/295 |
| 6,360,517 B1 | * | 3/2002 | Ishimori et al. | 56/320.1 |

FOREIGN PATENT DOCUMENTS

| | | | |
|---|---|---|---|
| AU | 510043 | 6/1980 | A01D/55/18 |
| DE | 298 16 120 U1 | 12/1998 | A01D/34/63 |
| EP | 0 300 642 | 1/1989 | A01D/34/73 |
| JP | 05 184218 | 7/1993 | A01D/34/73 |

* cited by examiner

*Primary Examiner*—Thomas B. Will
*Assistant Examiner*—Alicia Torres
(74) *Attorney, Agent, or Firm*—Kevin E. Joyce

(57) ABSTRACT

A rotary mower blade is formed with a notch at each end of the blade. Upwardly inclined vanes are provided on trailing edges of end portions of the blade adjacent the respective notches. Intermediate a central portion of the blade and the end portions, surfaces are formed extending downwardly from the leading to the trailing edges of the blade.

3 Claims, 2 Drawing Sheets

ROTARY MOWER BLADE

This application claims the benefit of U.S. Provisional Application No. 60/317,184, filed Sep. 6, 2001.

BACKGROUND OF THE INVENTION

1. Field Of the Invention

The present invention relates to a blade for a rotary mower, the blade being formed so as to reduce noise generated during mower operation.

2. Prior Art

The problem of noise generated by rotary mower blades has been recognized, and blades previously have been designed to reduce such noise. An example of such a blade is disclosed in European Patent Application 0 300 642 A1, published on Jan. 25, 1989. This Application discloses a mower blade wherein each end portion of the blade is sharpened at its leading edge for cutting purposes, and wherein at its trailing edge, an upwardly extending vane is provided. The vanes are displaced inwardly from the outermost edges of their respective end portions.

SUMMARY OF THE INVENTION

The present invention represents an improvement over the mower blade disclosed in European Patent Application 0 300 642 A1. More particularly, the trailing edge of each end portion of the blade is provided with a notch. The edge of each notch extends in a direction substantially perpendicular to the longitudinal axis of the blade for a distance approximating half of the blade's width. The notch edge then changes direction extending outwardly at an angle to the blade's longitudinal axis until the notch edge reaches the outer edge of the blade. The trailing edges of the blade's end portions adjacent the notches are bent upwardly, substantially along lines coextensive with the direction of the respective notch edges as the latter extend outwardly to the blade ends, to form an upwardly extending vane at each end of the blade adjacent a notch. A central portion of the blade is joined to the end portions by respective intermediate blade portions which are twisted relative to the blade's longitudinal axis so as to form inclined surfaces which descend from the leading edges of the blade to the trailing edges.

BRIEF DESCRIPTION OF THE DRAWINGS

The invention will be described in greater detail with respect to the accompanying drawings, wherein.

DETAILED DESCRIPTION OF A PREFERRED EMBODIMENT OF THE INVENTION

Figure 1:
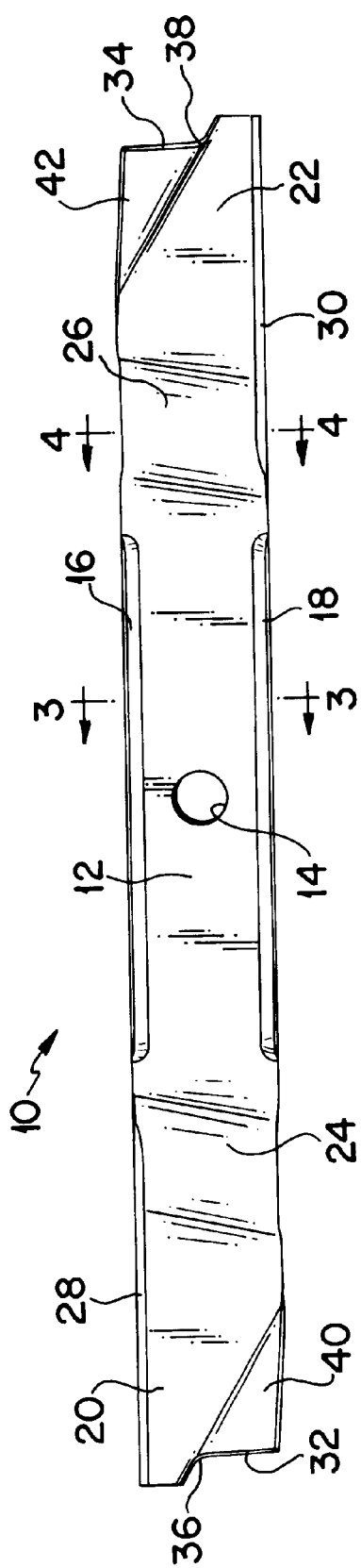
FIG. 1 is a top plan view of a mower blade according to the invention.
Figure 2:
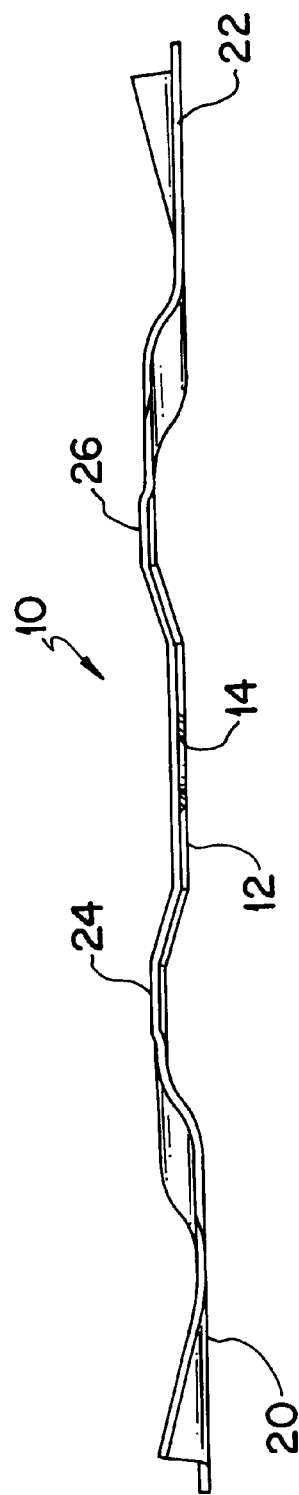
FIG. 2 is a side elevational view thereof.
Figure 3:
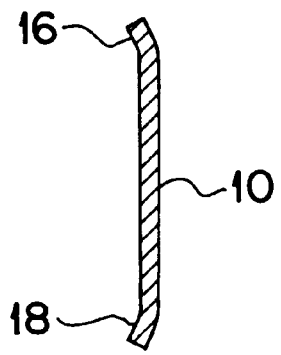
FIG. 3 is a cross-sectional view thereof taken along line 3—3 in FIG. 1.
Figure 5:
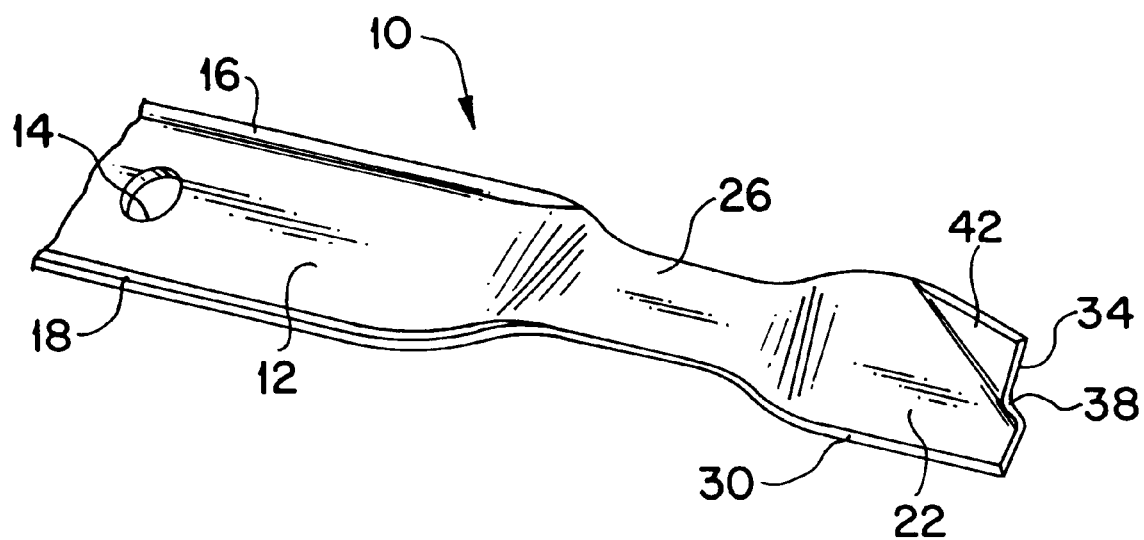
FIG. 5 is a perspective view of a portion of the blade shown in FIGS. 1 and 2.

Referring to FIGS. 1, 2 and 5 of the drawings, a blade 10 is formed from a piece of flat bar stock of rectangular cross-section. The blade includes a central portion 12 provided with an aperture 14 for receiving the drive shaft of a rotary mower (not shown) to which the blade may be attached in a conventional manner. The central portion 12 also includes upwardly bent edges 16 and 18 (FIG. 3).

Figure 4:
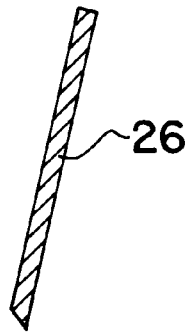
FIG. 4 is a cross-sectional view thereof taken along line 4—4 in FIG. 1.

The blade is further provided with end portions 20 and 22 joined of the central portion 12 by intermediate portions 24 and 26, respectively. The intermediate portions 24 and 26 are twisted about the longitudinal axis of the blade where they come together with central portion 12 and with end portions 20 and 22, respectively. More particularly, as viewed along the blade's longitudinal axis from end portion 22, the blade is twisted in a clockwise direction where central portion 12 and intermediate portion 26 meet. Where intermediate portion 26 joins end portion 22, the blade is twisted counterclockwise a like amount. The result is that intermediate portion 26 forms an inclined surface (shown in cross-section in FIG. 4) which slopes downwardly from the leading edge of portion 26, at an angle of approximately 13° relative to the section of central portion 12 between edges 16 and 18. Where intermediate portion 24 meets central portion 12 and the end portion 20, the blade is twisted to the same degree, but in an opposite sense, to the way the blade is twisted with respect to intermediate portion 26. Thus, portion 24 also is formed with an inclined surface which slopes downwardly, at an angle of approximately 13°, relative to the section of central portion 12 between edges 16 and 18.

The trailing edges of the blade are formed with notches 32 and 34 at opposite ends of the blade. Each notch is defined by an edge extending substantially perpendicular to the longitudinal axis of the blade from a trailing edge of respective end portions 20 and 22 to a location approximately midway between the leading and trailing edges of the blade. At that point, the notch edge changes direction to extend outwardly, at an angle of approximately 30° relative to the longitudinal axis of the blade, to the end of the blade. The corners formed by the changes in direction of the notch edges are identified as 36 and 38.

The trailing edges of end portions 20 and 22 adjacent notches 32 and 34, respectively, are bent to form upwardly extending vanes 40 and 42, the bending occurring along lines substantially coextensive with those portions of the notch edges extending from corners 36 and 38 to the ends of the blade. The vanes 40 and 42 are bent approximately 30° with respect to the plane of adjacent segments of end portions 20 and 22.

When a blade formed as just described is rotated by the engine of a rotary mower, cutting edges 28 and 30 along the leading edges of the blade cut grass efficiently with reduced noise. As the blade rotates, the surfaces of intermediate portions 24 and 26, which slope downwardly from the leading to trailing edges of portions 24 and 26, pressurize the air in the grass bed by forcing air into it. Pressure relief occurs outwardly of portions 24 and 26 due to centrifugal force. This pressure relief causes air turbulence in the grass bed which results in the grass moving upwardly into the path of the cutting edges 28 and 30 whereby the grass is cut. The upturned vanes provided on end portions 20 and 22 create additional turbulence for the grass cutting operation, as well as a flow pattern for discharging the cut grass upwardly and outwardly away from the rotating blade. The ends of the blade forwardly of the notches 32 and 34 reduce the strength of vortices created at the outer tip of the blade. Such weakened vortices, when colliding with weakened vortices of adjacent blades of a multi-blade mower, produce less noise than known blades not having vane notches. The notches reduce vane area and pumping action. However, the increased charge of air reaching the vane portions of the blade as a result of the action of the downwardly sloped portions 24 and 26 restores the pumping action.

What is claimed is:

1. A rotary mower blade, comprising:

an elongated central portion joined at its opposite ends to respective intermediate portions which, in turn, are joined to respective end portions of the blade, said central, intermediate and end portions being disposed along a common longitudinal blade axis;

each of said end portions including a sharpened edge surface extending towards the central portion along a leading edge of the blade, the sharpened edge of one of said end portions being disposed on the opposite side of the blade from the other sharpened edge;

a notch provided in an outside edge of each of said end portions adjacent, and in communication with, a respective vane formed in the trailing edge of the blade, each notch having an edge extending from a respective trailing edge of the blade in a direction substantially perpendicular to the blade's longitudinal axis to a location substantially midway between the leading and trailing edges of the blade and then to the respective end of the blade in a direction which is at an acute angle relative to the longitudinal axis of the blade;

each of said vanes comprising an upwardly bent portion of a respective trailing edge of the blade, the bend of each of said vanes occurring along a line substantially coextensive with that portion of the edge of its adjacent notch which forms an acute angle relative to the longitudinal axis of the blade; and each of said intermediate portions being twisted equally in opposite senses at locations where the intermediate portion meets the central portion and where it meets its respective end portion thereby forming an intermediate portion surface extending downwardly from its associated leading edge towards its associated trailing edge.

2. A blade according to claim 1, wherein said acute angle is approximately 30°.

3. A blade according to claim 1, wherein each intermediate portion is twisted by an amount which causes the associated intermediate portion surface to extend downwardly at an angle of approximately 13° relative to the central portion.

* * * * *